(12) United States Patent
Krieg et al.

(10) Patent No.: US 8,734,068 B2
(45) Date of Patent: May 27, 2014

(54) CUTTING TOOL WITH UNEQUAL FLUTE SPACING

(75) Inventors: Tilo Ernst Krieg, Fuerth (DE); Christoph Gey, Fürth (DE); Stephen Michael George, Greensboro, NC (US)

(73) Assignee: Kennametal Inc., Latrobe, PA (US)

( * ) Notice: Subject to any disclaimer, the term of this patent is extended or adjusted under 35 U.S.C. 154(b) by 855 days.

(21) Appl. No.: 12/852,756

(22) Filed: Aug. 9, 2010

(65) Prior Publication Data

US 2012/0034043 A1    Feb. 9, 2012

(51) Int. Cl.
*B23B 51/02*    (2006.01)

(52) U.S. Cl.
USPC .......................... 408/230; 408/227; 408/229

(58) Field of Classification Search
USPC .......................................... 408/230, 227, 229
See application file for complete search history.

(56) References Cited

U.S. PATENT DOCUMENTS

| | | | | |
|---|---|---|---|---|
| 2,391,396 A * | 12/1945 | Denison | .................. | 408/230 |
| 2,795,979 A * | 6/1957 | Zerwick | .................. | 408/229 |
| 3,182,531 A | 5/1965 | Moore et al. | | |
| 3,645,642 A | 2/1972 | Koslow | | |
| 3,706,504 A | 12/1972 | Simonffy | | |
| 4,662,803 A | 5/1987 | Arnold | | |
| 4,740,121 A * | 4/1988 | Arnold | .................. | 408/224 |
| 4,913,603 A | 4/1990 | Friedli et al. | | |
| 5,282,705 A * | 2/1994 | Shiga et al. | .................. | 408/211 |
| 5,636,948 A | 6/1997 | Rexius | | |
| 5,704,740 A | 1/1998 | Ebenhoch et al. | | |
| 5,876,155 A | 3/1999 | Link et al. | | |
| 5,967,712 A | 10/1999 | Magill et al. | | |
| 6,379,090 B1 | 4/2002 | Halley et al. | | |
| 6,419,488 B1 | 7/2002 | McSpadden et al. | | |
| 6,431,962 B1 | 8/2002 | George | | |
| 6,602,029 B1 | 8/2003 | George | | |
| 6,698,981 B1 | 3/2004 | Beno et al. | | |
| 6,739,809 B2 | 5/2004 | Shaffer | | |
| 6,830,502 B2 | 12/2004 | Buettiker et al. | | |
| 7,094,056 B2 | 8/2006 | Scianamblo | | |

(Continued)

FOREIGN PATENT DOCUMENTS

| | | | | |
|---|---|---|---|---|
| DE | 2553035 A | * 6/1977 | .............. | B23B 51/04 |
| EP | 330107 A1 | * 8/1989 | .............. | B23D 77/00 |

(Continued)

OTHER PUBLICATIONS

Korean Intellectual Property Office, International Search Report for International Application No. PCT/US2011/039570, dated Feb. 2, 2012.

*Primary Examiner* — Andrea Wellington
*Assistant Examiner* — Chwen-Wei Su
(74) *Attorney, Agent, or Firm* — Larry R. Meenan, Esq.

(57) ABSTRACT

A cutting tool having a shaft with a longitudinal axis, wherein the cutting tool includes a first flute extending about the longitudinal shaft along a helix angle and a first cutting edge adjacent the first flute. The cutting tool also includes a second flute extending about the longitudinal shaft along a helix angle and a second cutting edge adjacent a second flute. The cutting tool further includes a third flute extending about the longitudinal shaft along a helix angle and a third cutting edge adjacent the third flute. The first cutting edge, the second cutting edge, and the third cutting edge are unequally angularly spaced from each other.

7 Claims, 3 Drawing Sheets

(56) References Cited

U.S. PATENT DOCUMENTS

| | | |
|---|---|---|
| 7,207,752 B2 | 4/2007 | Schulte |
| 7,399,146 B2 | 7/2008 | Long, II et al. |
| 2002/0090273 A1 | 7/2002 | Serwa |
| 2004/0120777 A1 | 6/2004 | Noland |
| 2006/0115339 A1* | 6/2006 | Wakui et al. ............. 408/230 |
| 2008/0199268 A1* | 8/2008 | Krenzer et al. ........... 408/230 |

FOREIGN PATENT DOCUMENTS

| | | | |
|---|---|---|---|
| EP | 1561535 A1 * | 8/2005 | ............ B23D 77/00 |
| JP | 64002815 A * | 1/1989 | ............ B23D 77/00 |
| JP | 2002-103123 | 4/2002 | |
| JP | 2002301616 A * | 10/2002 | ............ B23B 51/08 |
| JP | 2009039811 A * | 2/2009 | ............ B23B 51/00 |
| WO | WO 2005061164 A1 * | 7/2005 | ............ B23D 77/00 |
| WO | 2008/001412 A1 | 1/2008 | |

\* cited by examiner

CUTTING TOOL WITH UNEQUAL FLUTE SPACING

FIELD OF THE INVENTION

The present invention relates to a cutting tool and, more particularly, relates to a cutting tool, such as a drill, with unequal flute spacing.

BACKGROUND INFORMATION

A cutting tool, such as a drill or twist drill, is generally comprised of a cylindrical shaft having at least one flute and land, which follow a helical angle to a forward cutting edge at the forward end of the shaft. The land has associated with it a margin and a clearance portion behind the margin. A side cutting edge is defined by the intersection of the flute with the margin of the land.

An example of a drill of this type is shown, for example, in U.S. Pat. No. 4,913,603 and U.S. Patent Application Publication No. 2008/0199268 A1. The '603 patent and the '268 patent publication describe the problem known in the technical literature as "chatter", a problem that is experienced with a drill during the drilling process when the irregular rotational action of the drill during the drilling process results in an irregular surface structure of the boring wall. This phenomenon is due in particular to the fact that linear or spiral chip flutes are shaped into the generated surfaces of the drills to remove the chips that are formed during the drilling process. Frequently, the chip flutes on one hand and the cutting edges of the drill on the other hand are distributed symmetrically over the periphery of the drill. This symmetrical distribution has the further disadvantage that the vibrations of the drill that cause the "chatter" recur periodically during the drilling process. This periodic recurrence of the vibrations causes an increase in the amplitude of the vibrations, i.e. a "build-up" of the chatter during the drilling process. The result is that the irregularities in the side walls of the hole which is being bored, which irregularities are also called ""chatter marks"" increase, resulting in a deterioration in the quality of the boring over the length of the drilling process.

To reduce this problem, it is generally known that the minor cutting edges of the drill that are present on the drill periphery can be provided with lands. These lands are generally snug up against the inside wall of the boring and act on the drill in the manner of support fins. The '603 patent and the '268 patent publication describe that an additional measure to prevent the untrue running of the drill is the asymmetrical arrangement of the chip flutes and correspondingly of the drill cutting edges.

The present invention has been developed in view of the foregoing.

SUMMARY OF THE INVENTION

An aspect of the present invention is to provide a cutting tool having a shaft with a longitudinal axis, wherein the cutting tool includes a first flute extending about the longitudinal shaft along a helix angle and a first cutting edge adjacent the first flute. The cutting tool also includes a second flute extending about the longitudinal shaft along a helix angle and a second cutting edge adjacent a second flute. The cutting tool further includes a third flute extending about the longitudinal shaft along a helix angle and a third cutting edge adjacent the third flute. The first cutting edge, the second cutting edge, and the third cutting edge are unequally angularly spaced from each other.

Another aspect of the present invention is to provide a cutting tool having a shaft with a longitudinal axis, wherein the cutting tool includes a first flute extending about the longitudinal shaft along a helix angle and a first land adjacent to the first flute and extending about the longitudinal axis of the shaft along the helix angle, wherein the first land has a first margin. The cutting tool also includes a second flute extending about the longitudinal shaft along a helix angle and a second land adjacent to the second flute and extending about the longitudinal axis of the shaft along the helix angle, wherein the second land has a second margin. The cutting tool further includes a third flute extending about the longitudinal shaft along a helix angle and a third land adjacent to the third flute and extending about the longitudinal axis of the shaft along the helix angle, wherein the third land has a third margin. The first margin, the second margin, and the third margin have unequal peripheral dimensions.

These and other aspects of the present invention will be more fully understood following a review of this specification and drawings.

DETAILED DESCRIPTION

In one aspect of the invention, the invention is directed to a cutting tool having a helical flute. For purposes of explanation, a twist drill will be described herein with the understanding that the invention is applicable to other cutting tools having helical flutes, such as, for example, taps and reamers.

Figure 1:
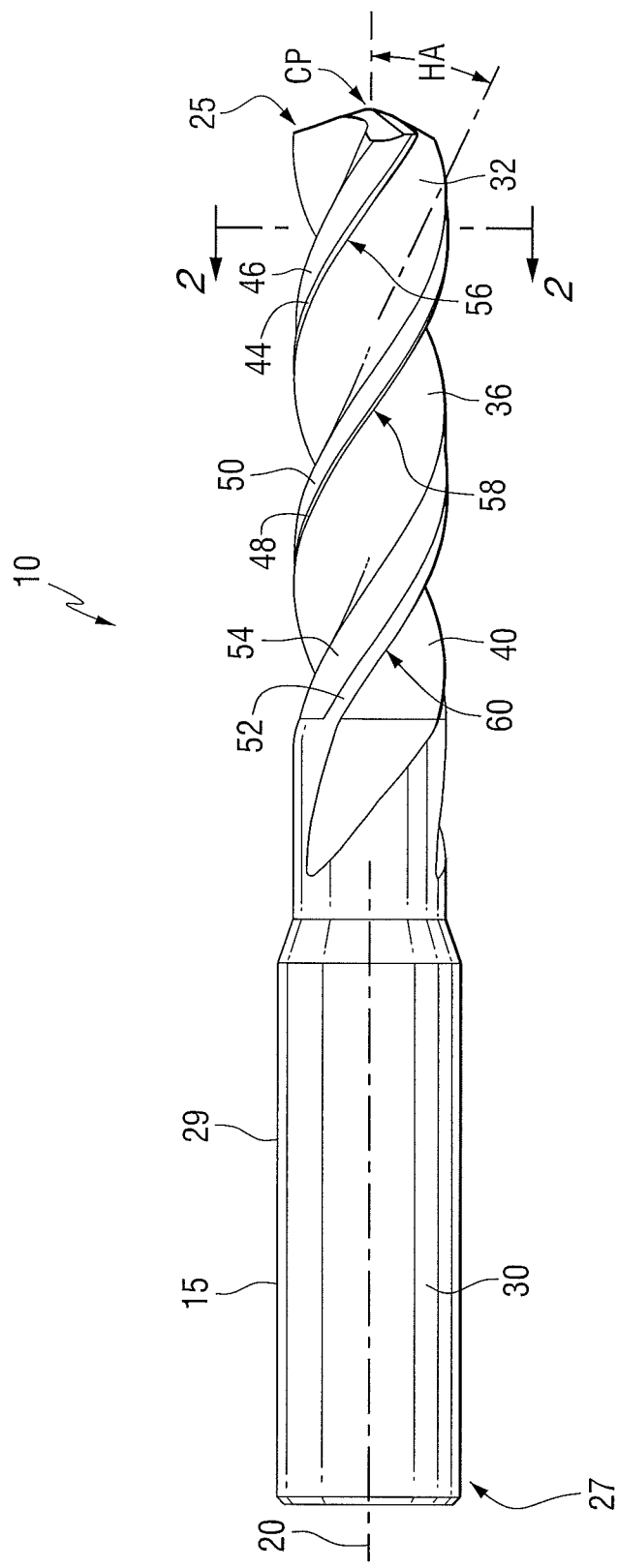
FIG. 1 is a side elevational view of a cutting tool, in accordance with an aspect of the invention.
Figure 2:
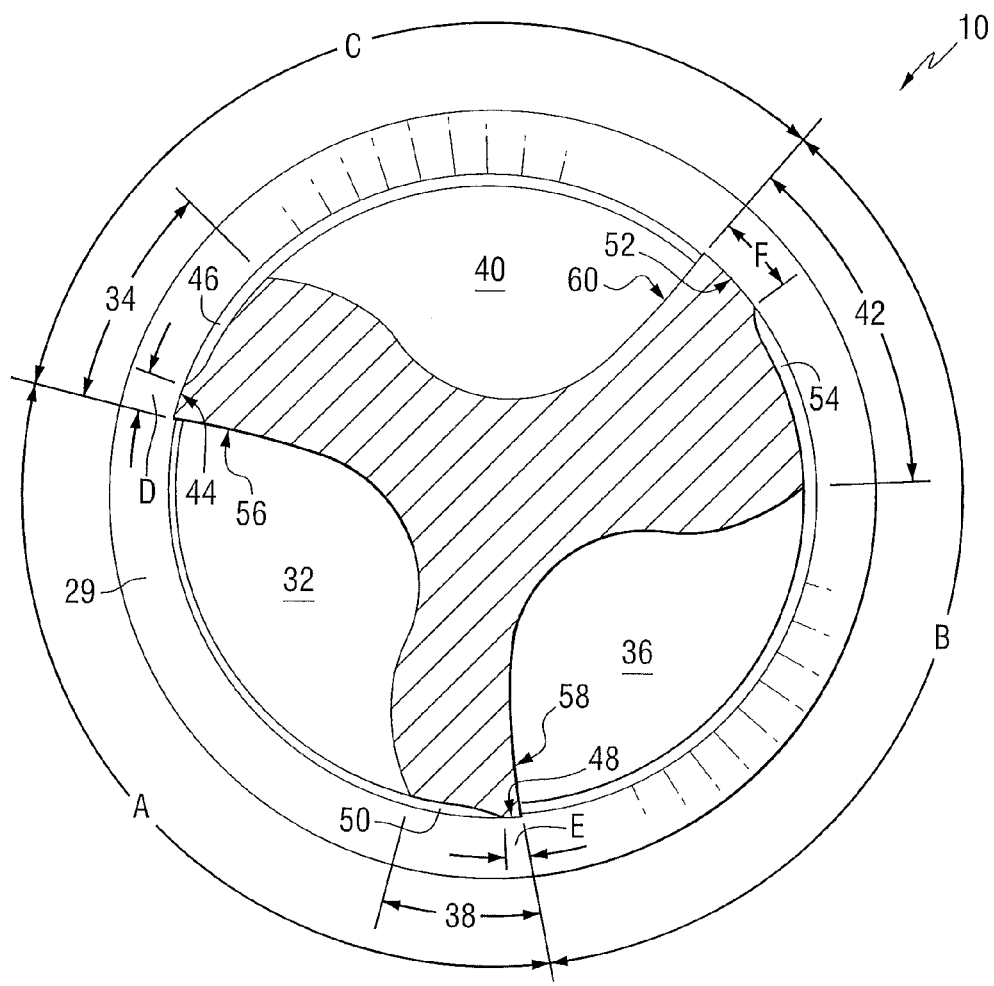
FIG. 2 is a section view taken along line 2-2 of FIG. 1, in accordance with an aspect of the invention.

Referring to FIGS. 1 and 2, there is shown a cutting tool 10 which, for purposes of description herein, will be referred to as a twist drill, having a shaft 15 with a longitudinal axis 20. The shaft 15 has a forward end 25 capable of contacting and cutting a work piece (not shown). At a rearward end 27 of the shaft 15 is a shank 29, which may be generally cylindrical, or may have a non-cylindrical shape to fit within a chuck (not shown). While the shank 29 is illustrated as cylindrical, it should be appreciated that the shank 29 may have other shapes such as, for example, square, hexagonal, conical, or any other suitable non-cylindrical shape for gripping within a chuck.

The shaft 15 has an external surface 30 having formed therein a first flute 32 with a corresponding first land 34, a second flute 36 with a corresponding second land 38, and a third flute 40 having a corresponding third land 42. Each land extends about the longitudinal axis 20 along a helix angle HA (shown in FIG. 1). In addition, the first land 34 includes a first margin 44 and a corresponding clearance portion 46. The second land 38 has a second margin 48 and a corresponding clearance portion 50. The third land 42 has a third margin 52 and a corresponding clearance portion 54.

Adjacent to the first flute 32 is a first cutting edge 56. Similarly, adjacent to the second flute 36 is a second cutting edge 58 and adjacent to the third flute 40 is a third cutting edge 60. In one aspect of the invention, the first cutting edge 56, the second cutting edge 58, and the third cutting edge 60 all originate at a center cutting point CP wherein the center cutting point CP is positioned adjacent to the forward end 25 of the shaft 15 (see FIG. 3).

In one aspect of the invention, the first cutting edge 56, the second edge cutting edge 58, and the third cutting edge 60 are unequally angularly spaced from each other. More specifically, as shown in FIG. 2, the first cutting edge 56 is angularly spaced from the second cutting edge 58 at an angle A, the second cutting edge 58 is angularly spaced from the third cutting edge 60 at an angle B, and the third cutting edge 60 is angularly spaced from the first cutting edge 56 at an angle C. By providing the unequal angular spacing between the three cutting edges 56, 58 and 60, the problem associated with drill bits described herein regarding "chatter" may be minimized, as will be explained in more detail herein.

In another aspect of the invention, angle A may be in the range of about 100 degrees to about 115 degrees. Angle B may be in the range of about 110 degrees to about 125 degrees. Angle C may be in the range of about 125 degrees to about 140 degrees. In an exemplary embodiment of the invention, angle A equals 108 degrees, angle B equals 118 degrees, and angle C equals 134 degrees. Thus, it will be appreciated that in accordance with aspects of the invention, angles A, B, and C are all unequal for a particular drill bit configuration.

In another aspect of the invention, the first margin 44, the second margin 48, and the third margin 52 all have unequal peripheral dimensions. More specifically, as shown in FIG. 2 the first margin 44 has a peripheral dimension corresponding to an angle D, as indicated by arrow D. The second margin 48 has a peripheral dimension corresponding to an angle E, as indicated by arrow E. The third margin 52 has a peripheral dimension corresponding to an angle F, as indicated by arrow F. As used herein, "peripheral dimension" means an arc length for margins 44, 48 and 52 that is calculated based on a corresponding angle. Providing the margins to have unequal peripheral dimensions further contributes to reducing the described problem of chatter in drill bits.

In one aspect of the invention, the angle D may be in the range of about 4.0 degrees to about 10.0 degrees. The angle E may be in the range of about 0.2 degrees to about 8.0 degrees. The angle F may be in the range of about 12.0 degrees to about 20.0 degrees. In an exemplary embodiment of the invention, the angle D is 5.0 degrees the angle E is 2.0 degrees and the angle F is 15.0 degrees.

Figure 3:
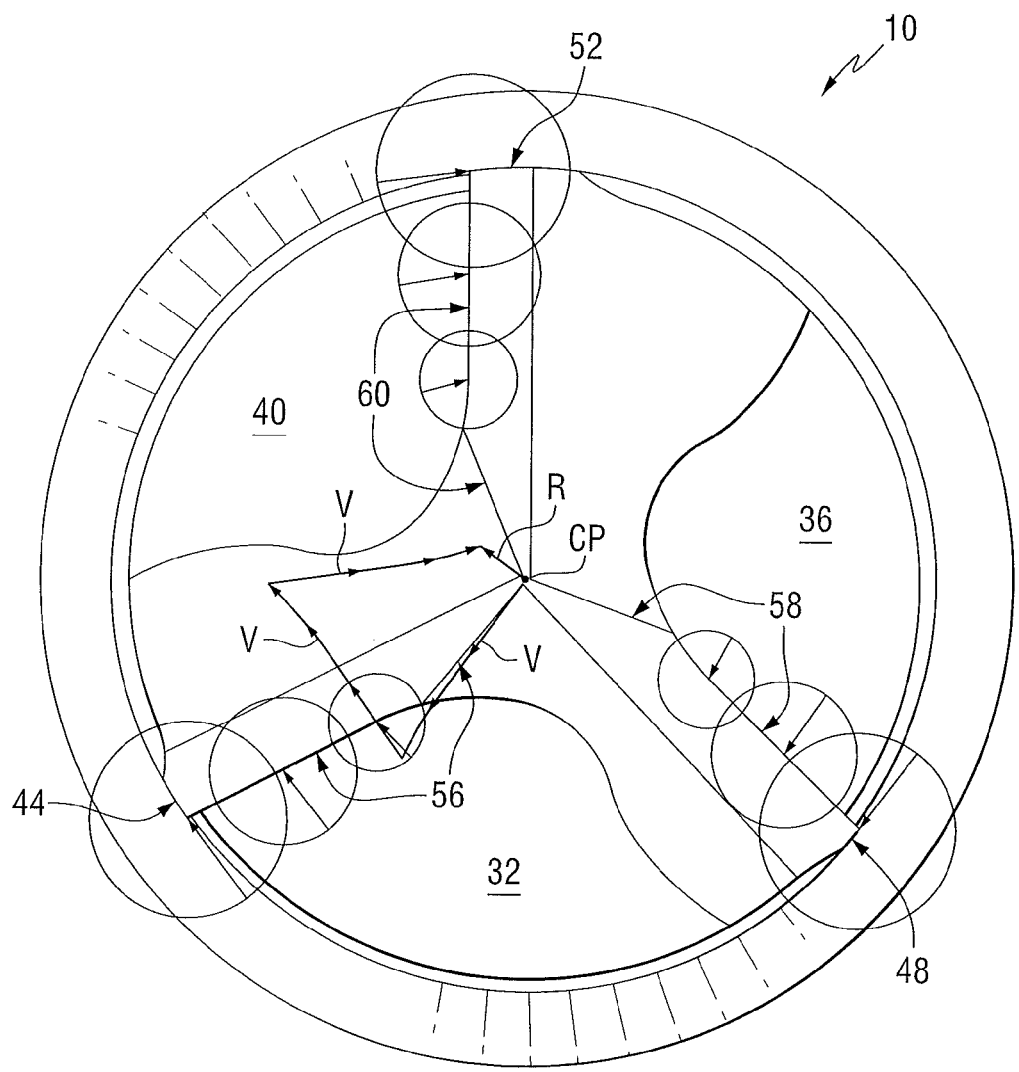
FIG. 3 is a resultant force diagram of the cutting tool shown in FIGS. 1 and 2, in accordance with an aspect of the invention.

FIG. 3 is a resultant force diagram for the cutting tool 10, e.g., the drill bit, in accordance with an aspect of the invention. Along each cutting edge (56, 58, 60) are displayed various representative force vectors. These vectors change in magnitude (indicated by their length and radius of inscribed circle where larger length and radius equals greater magnitude) based on their distance from the center cutting point CP, and therefore are related to their respective cutting velocity. The direction of these vectors in the diagram is determined by being constructed tangent to the direction of velocity of the cutting edge at the point at which they are displayed. Placing these representative force vectors "head-to-tail" in the method of a classic force analysis results in the chain of vectors V shown originating from center CP. It can then be seen that as the vectors do not return to the center cutting point CP, there must be a resultant force that is acting on the tool from this unbalance. This resultant force R is also shown originating from the center CP and connecting to the end of the vector chain, and shows the representative magnitude and direction of force R that is important to the invention. It can be seen that the resultant force R is directed generally between margins 44 and 52, therefore shifting the contact force against the hole wall to these margins. Therefore, margin 48 can be minimized in its size to reduce friction. Margins 44 and 52 are larger to act against the resultant force R, with margin 52 being the largest as it is placed closer to the direction of the force. This arrangement causes the largest margin 52 to act as a guiding land, acting against the disruptive forces of chatter by always maintaining contact with the hole wall, and therefore damping radial motion. In this three flute arrangement of the invention, margin 44 also acts in support of margin 52 to actively engage in contact with the hole wall and, as it is positioned along a third cutting edge and allows a higher feedrate to be achieved. These characteristics in turn cause the holemaking process to have greatly enhanced size, straightness, and cylindricity control at much higher metal removal rates than without use of the invention.

Whereas particular embodiments of this invention have been described above for purposes of illustration, it will be evident to those skilled in the art that numerous variations of the details of the present invention may be made without departing from the invention as defined in the appended claims.

What is claimed is:

1. A cutting tool having a shaft with a longitudinal axis, the cutting tool comprising:
a first flute extending about the longitudinal shaft along a helix angle and a first land adjacent to the first flute and extending about the longitudinal axis of the shaft along the helix angle, wherein the first land has a first margin;
a first cutting edge adjacent the first flute;
a second flute extending about the longitudinal shaft along a helix angle and a second land adjacent to the second flute and extending about the longitudinal axis of the shaft along the helix angle, wherein the second land has a second margin;
a second cutting edge adjacent the second flute;
a third flute extending about the longitudinal shaft along a helix angle and a third land adjacent to the third flute and extending about the longitudinal axis of the shaft along the helix angle, wherein the third land has a third margin;
a third cutting edge adjacent the third flute;
wherein the first cutting edge, the second cutting edge and the third cutting edge are unequally angularly spaced from each other;
wherein the first margin, the second margin and the third margin have unequal peripheral dimensions; and
a cutting point positioned adjacent a forward end of the shaft and at an axial center of the shaft, wherein the first cutting edge, the second cutting edge and the third cutting edge all originate at the cutting point.

2. The cutting tool of claim 1, wherein the first cutting edge is angularly spaced from the second cutting edge an angle in the range of about 100 degrees to about 115 degrees.

3. The cutting tool of claim 1, wherein the second cutting edge is angularly spaced from the third cutting edge an angle in the range of about 110 degrees to about 125 degrees.

4. The cutting tool of claim 1, wherein the third cutting edge is angularly spaced from the first cutting edge an angle in the range of about 125 degrees to about 140 degrees.

5. The cutting tool of claim 1, wherein the first margin has a peripheral dimension corresponding to an angle in the range of about 4.0 degrees to about 1.0 degrees.

6. The cutting tool of claim 1, wherein the second margin has a peripheral dimension corresponding to an angle in the range of about 0.2 degrees to about 8.0 degrees.

7. The cutting tool of claim 1, wherein the third margin has a peripheral dimension corresponding to an angle in the range of about 12.0 degrees to about 20.0 degrees.

\* \* \* \* \*